United States Patent [19]

Yanamoto et al.

[11] Patent Number: 5,395,635

[45] Date of Patent: Mar. 7, 1995

[54] METHOD OF PRODUCING WHITE CACAO NIBS AND FOOD USING WHITE CACAO NIBS

[75] Inventors: Kazuji Yanamoto, Kobe; Hideo Sasai, Kyoto; Akira Inoue, Kawanishi, all of Japan

[73] Assignee: Ezaki Glico Kabushiki Kaisha, Osaka, Japan

[21] Appl. No.: 117,220

[22] Filed: Sep. 3, 1993

[30] Foreign Application Priority Data

Mar. 12, 1993 [JP] Japan ................................ 5-078784

[51] Int. Cl.⁶ ............................................... A23G 1/00
[52] U.S. Cl. .................................... 426/331; 426/467; 426/482; 426/629; 426/631
[58] Field of Search ............... 426/430, 431, 482, 484, 426/467, 468, 469, 466, 45, 312, 331, 629, 631

[56] References Cited

U.S. PATENT DOCUMENTS

| | | | |
|---|---|---|---|
| 2,813,795 | 11/1957 | Hale | 426/631 |
| 3,056,677 | 10/1962 | Colton | 426/631 |
| 3,778,519 | 12/1973 | Taralli | 426/631 |
| 4,331,692 | 5/1982 | Drevici | 426/482 |

FOREIGN PATENT DOCUMENTS

| | | | |
|---|---|---|---|
| 2059243 | 4/1981 | United Kingdom | 426/45 |
| 2241146 | 8/1991 | United Kingdom | 426/45 |

*Primary Examiner*—Carolyn Paden
*Attorney, Agent, or Firm*—Moonray Kojima

[57] ABSTRACT

Raw cacao beans are heated in hot water or water vapor containing an acidic, alkaline or alcoholic substance without being subjected to fermentation or after being slightly fermented, whereby enzymes contained in the beans are inactivated, or microorganisms present on the beans are destroyed, nibs of the beans being thereby prevented from undergoing a color change.

This method enables production of white cacao nibs, and it is thus possible to prepare white chocolates and other varieties of food having good flavor and taste by using such cacao nibs.

11 Claims, No Drawings

METHOD OF PRODUCING WHITE CACAO NIBS AND FOOD USING WHITE CACAO NIBS

BACKGROUND OF THE INVENTION

The present invention relates to a method of producing white cacao nibs which have not been obtainable in the past, and to food using white cacao nibs produced by the method which has novel color tone and flavor.

Generally, nibs of cacao beans contain a natural pigment known as anthocyan. This causes cacao nibs to go through color changes: purple just after harvest, to brownish purple after they are subjected to fermentation, and further to brown when they are dried.

Certain kinds of cacao beans are colorless (practically white) because no anthocyan is present in cacao nibs thereof. However, cacao nibs of such a colorless kind are still subject to a color change, to brown when they are fermented, and after having been dried, the nibs as a whole further change in color to bright brown. When dried without being passed through the process of fermentation, they are still subject to a color change, to brown. As such, dried cacao nibs which are white in color have never been produced in the past.

There is a kind of chocolate, white in color, which is generally known as white chocolate. This chocolate is made essentially of a vegetable fat (yellowish white in color) contained in cacao nibs without using cacao nibs as such. Therefore, white chocolate lacks characteristic astringency and bitterness of a real chocolate, and is found unsatisfactory in many respects from the standpoint of flavor. As such, in some countries such kind of chocolate is prohibited from being called a chocolate.

It is, therefore, an object of the present invention to provide a method of producing white cacao nibs.

It is another object of the invention to provide varieties of food having good flavor and taste, including white chocolates, produced by using such white cacao nibs.

SUMMARY OF THE INVENTION

In order to accomplish the foregoing objects, according to one aspect of the present invention, there is provided a method of producing white cacao nibs characterized in that cacao beans of the colorless type, after harvest thereof, are preheated without being subjected to fermentation or after being slightly fermented and are then dried.

According to another aspect of the invention, cacao beans of the colorless type, after harvest thereof, are preheated in an alcoholic atmosphere without being subjected to fermentation or after being slightly fermented and are then dried.

In a further aspect of the invention, cacao beans of the colorless type, after harvest thereof, are held in acidic or alkaline hot water without being subjected to fermentation or after being slightly fermented and are then dried.

In a still further aspect of the invention, cacao beans of the colorless type, after harvest thereof, are held in acidic or alkaline hot water containing alcohol, without being subjected to fermentation or after being slightly fermented, and are then dried.

The invention also provides food using white cacao nibs produced according to the method of producing such cacao nibs.

DETAILED DESCRIPTION OF THE INVENTION

In the present invention, the term "after harvest" refers to the state of cacao beans, as removed from pods and still enclosed in a pulp, such that they have not yet gone through fermentation. Cacao beans in such a state are called raw beans, and when the raw beans are finally dried, they are called dried beans irrespective of whatever treatment they may have passed through.

The term "fermentation" is a term commonly used for the treatment of cacao beans. For example, raw beans, as contained in a box or piled up, are allowed to stand as they are or while being agitated as required, in a temperature atmosphere of about 30° C. for three to seven days, which treatment is called "fermentation". The term "slightly fermented" refers to a treatment to be given in such a manner that after pods are cut open, raw beans are actually allowed to stand under a fermentable condition for a time period of less than about two days.

Cacaos useful for the purpose of the invention are those having white nibs, which include, for example, DR (DJATI ROENGGO)-2 clone, a cultivar grown in Indonesia, and CATONGO clone, a cultivar grown in Brazil.

According to the invention, raw beans or those which have been slightly fermented are preheated. Beans may be washed in water for pulp removal prior to preheating.

Preheating is effected by immersing the beans in hot water, steaming them with water vapor, or heating under pressure in a water vapor atmosphere, at temperatures of about 60° to 120° C. for a time period of 30 seconds to about 1 hour, thereby to deactivate enzymes present in tile beans or destroy microorganisms present on the beans.

Hot water may be such that an alkaline or acid substance has been added thereto. Useful alkaline substances for this purpose include, for example, potassium carbonate, sodium carbonate, ammonium carbonate, ammonium bicarbonate, sodium bicarbonate, magnesium oxide, and sodium hydroxide. Useful acid substances include, for example, citric acid, acetic acid, tartaric acid, ascotbit acid, succinic acid, malic acid, lactic acid, and fumaric acid.

Alcohols may also be used in connection with preheating, including, but not limited to ethanol, for example, propylene glycol, and propanol. Such alcohols are to be contained in hot water or water vapor. For use with water vapor, the alcohol may be heated at normal pressures or under pressure.

Preheated beans are then dried. Drying may be effected in the sun; by exposure to hot air; by heating under direct heat or otherwise without any particular limitation. Thus, white cacao nibs can be obtained.

After drying, in some situation, the white nibs may be further dried or roasted. For this purpose, however, any excessively high temperature should not be used, it being necessary to use a temperature of the order of not more than 130° C. in order to allow the nibs to remain white in color. Such further drying or roasting may be carried out by various different means, such as hot air drying, direct heating, microwave heating, microwave heating under reduced pressure, frying, and vacuum frying. After the nibs are so further dried or roasted while being kept white in color, they are ground according to the conventional procedure, whereby a target product or a cacao mass made of white cacao nibs can be obtained.

A white chocolate can be obtained by the white cacao mass, produced according to the above described method, being kneadingly mixed with icing sugar, dried milk, and/or other material, such as conventional chocolate material.

Where it is unnecessary to keep the white cacao mass in white color, the cacao mass may be roasted in whatever way as required.

The present invention is directed to preventing raw beans from changing in color due to tile action of enzymes or microorganisms and, in some situation, to preventing the raw beans from browning due to a sugar amino acid reaction or the like; and to this end, the invention comprises a functional combination of steps for processing of the raw beans. Therefore, insufficient or nonuniform preheating may result in a product having unevenly colored portions developed due to an enzymic action. For example, if beans immersed in hot water are prematurely removed, the resulting beans may be such that a central portion of the bean is brown colored.

Beans in their state after harvest have a rather strong astringent taste, and when they have been treated in a neutral hot water, the beans still taste astringent, whereas when the beans are treated in an acidic or alkaline hot water, more particularly alkaline, such astringency is substantially reduced, whereby the taste of the beans can be suitably adjusted. Whichever treatment may be given, acidic or alkaline, there will occur no coloration of nibs. A similar effect of astringency reduction may be obtained when beans are treated in hot water containing alcohol.

When beans after harvest are treated in water vapor, the beans still have a rather strong astringent taste, whereas when they are treated in water vapor containing alcohol, such astringent taste may likewise be substantially reduced.

For the purpose of drying beans or roasting dried beans, care should be used to insure that the surface temperature of the beans will not exceed 130° C., or otherwise the beans are likely to become browned.

When nibs are subjected to the process of fermentation according to the conventional procedure, the nibs will tend to change in color to brown from their outer surface inward. However, nibs which have been subjected to a slight degree of fermentation as in the present invention will not turn brown and are found to be of agreeable taste such that their inherent astringent taste has been reasonably reduced.

The following examples are given to further illustrate the present invention.

EXAMPLE 1

Pods harvested from a cacao tree of the DR-2 clone were cut open and beans were removed from the pods. Six hundred grams of beans, wrapped in a dishcloth, were placed in a steamer, in which the beans were water-vapor treated for ten minutes. The treated beans, after they were removed from the steamer, were allowed to cool down and were then dried in the sun for six days so that their water content was reduced to not more than 7%. When samples of the dried beans were cut with a knife, it was found that they had a section of white color.

EXAMPLE 2

Six hundred grams of beans, removed from pods in same way as in Example 1, were placed in an enamel pot in which were contained about 4 liters of a boiling solution of 1 wt % potassium carbonate (pH 11). Heating was continued for 90 seconds, to allow the solution temperature to reach more than 99° C., and thereafter the solution was further boiled for 2 minutes. Then, the beans were put into cold water for cooling. After this step of cooling, the beans were taken out and dried in the sun for six days so that their water content was reduced to not more than 7%. Nibs of the beans were found to be white in the interior as well as on the surface, and had satisfactory flavor with less astringent taste.

EXAMPLE 3

Beans removed from pods in same way as in Example 1 were placed in a fermentation box in which they were caused to go through some 15-hour period of fermentation. Fermentation was carried out according to the conventional procedure. Then, about 600 grams of the beans, washed in water and cleaned of pulp, were placed in an enamel pot containing about 4 liters of boiling water, in which they were boiled for 3.5 minutes under continued heating. After boiling, the beans were removed from the pot, being allowed to cool down. Then, the beans were dried in the sun for 6 days so that their water content was reduced to not more than 7%. Nibs of the beans were found to be of white color in both the interior and the outer appearance.

For purposes of comparison, beans which were caused to go through a 15-hour period of fermentation in same way as in the present example but which were not subjected to preheating were dried in the sun for 6 days as they were. In this case, the beans had a color change to a non-uniform brown.

EXAMPLE 4

The dried beans prepared in Example 2 were exposed to hot air of 100° C. for 3 minutes, and then their outer skins were removed. White nibs thus obtained were roasted in hot air at 120° C. for 40 minutes. The roasted nibs were ground into a white cacao mass.

A chocolate of the invention consisting of 10 parts of white cacao mass, 30 parts of cocoa butter, 40 parts of sugar, 20 parts of whole dried milk, and 0.5 part of lecithin was prepared. For purposes of comparison, a chocolate of the conventional type was also prepared which was identical with the chocolate of the invention except that a conventional cacao mass was used instead of the white cacao mass.

The two chocolates were examined as to how they differed in color from each other, when their respective fat contents were still in a molten state (see Table 1). It can be clearly seen from Table 1 that the chocolate of the invention is brighter (actually close to white) in color than the conventional chocolate.

TABLE 1

|  | Y | x | y |
| --- | --- | --- | --- |
| Chocolate of Invention | 46.7 | 0.35 | 0.35 |

TABLE 1-continued

| | Y | x | y |
|---|---|---|---|
| Conventional Chocolate | 14.7 | 0.36 | 0.40 |

Notes:
(1) Differential colorimeter employed in the above measurement: Digital colorimetric color-difference meter, type ND - 101D, made by Nihon Denshoku Kogyo K. K.;
(2) Y represents luminous fractional reflectance;
(3) x, y represent chromaticity values $$\left( x = \frac{X}{X+Y+Z}, y = \frac{Y}{X+Y+Z} \right),$$

according to the CIE (Commission Internationale de Enluminure) system;
(4) X, Y, and Z represent psychophysical color specification values measured on a specific wavelength.

For comparison purposes, along with the chocolate of the invention, a so-called white chocolate was prepared which consisted of 40 parts of cocoa butter, 40 parts of sugar, 20 parts of whole dried milk, and 0.5 part of leoithin.

The chocolate of the invention and the white chocolate were compared with in their taste by a panel. The chocolate of the invention was predominantly favored in that it was more closely akin in taste to a real chocolate and had excellent flavor.

EXAMPLE 5

The dried beans prepared in Example 2 were roasted in hot air of 135° C. for 20 minutes, and then their outer skins were removed to give cacao nibs. The nibs had a bright brown color. To 20 parts of a bright-color cacao mass obtained by grinding the cacao nibs were added 25 parts of cocoa butter, 40 parts of sugar, 15 parts of whole dried milk, and 0.5 part of lecithin to obtain a chocolate of the invention. Apparently, this chocolate had a brighter color and a more unique flavor as compared with a chocolate which was prepared in the same way as the chocolate of the invention except that a conventional cacao mass was used therein.

EXAMPLE 6

Two hundred fifty grams of granulated sugar and 85 grams of water were placed in a pot and boiled down to 106° C., to which was added 1 kg. of white cacao nibs in their raw state, the cacao nibs having been obtained from the dried beans, prepared in Example 2, by removing their outer skins. Boiling was further continued under stirring until the sugar had been reduced to syrupy. Then, the cacao nibs with sugar syrup were removed from the pot and cooled, The product thus obtained was of a conventionally unavailable form of cacao nibs such that brown colored cacao nibs were wrapped in a sugar coat, and had good flavor and high taste characteristics,

EXAMPLE 7

Pods harvested from a cacao tree of the DR-2 clone were cut open and beans were removed from the pods, Six hundred grams of such beans wrapped in a dishcloth were placed in a steamer, being added a 20% ethanol in a bottom portion of the steamer, which solution was heated for treating the beans for 10 minutes.

After being removed from the steamer, the beans were allowed to cool down. Then, the beans were dried in the sun so that their water content was reduced to not more than 7%. Samples of the beans were cut with a knife, it being found that the sections of beans were white color. The beans had good flavor with less astringent taste.

EXAMPLE 8

The dried beans prepared in Example 7. were exposed to hot air of 100° C. for 3 minutes, and then their outer skins were removed. White nibs thus obtained were roasted by hot air at 120° C. for 40 minutes. The roasted nibs were ground into a white cacao mass.

A chocolate of the invention consisting of 10 parts of white cacao mass, 30 parts of cocoa butter, 40 parts of sugar, 20 parts of whole dried milk, and 0.5 part of lecithin was prepared. Also, another chocolate was prepared which was identical with the first mentioned chocolate except that the cacao mass obtained in Example 1 was used instead of the cacao mass of Example 7. The two chocolates were tasted by a panel consisting of 20 members for evaluation. The evaluation results are shown in Table 2.

TABLE 2

| | Chocolate using Example-7 cacao nibs steamed in alcohol soln. | Chocolate using Example-1 cacao nibs steamed in water. | No diff. |
|---|---|---|---|
| Which is more Astringent | 0 | 19 | 1 |
| Which is more Preferable | 19 | 0 | 1 |

(value in persons)

EXAMPLE 9

Beans removed from pods in same way as in Example 1 were placed in a fermentation box in which they were caused to go through some 15-hour period of fermentation. Fermentation was carried out according to the conventional procedure. Then, about 600 grams of the beans, washed in water and cleaned of pulp, were placed in an enamel pot containing about 4 liters of boiling water having a 10% ethanol content, in which they were boiled for 3.5 minutes under continued heating. After boiling, the beans were removed from the pot, being allowed to cool down. Then, the beans were dried in the sun for 6 days so that their water content was reduced to not more than 7%- Nibs of the beans were found to be of white color in both their interior and their outer appearance. The nibs had good flavor with less astringent taste.

EXAMPLE 10

Beans removed from pods in same way as in Example 1 were placed in a fermentation box in which they were caused to go through some 15-hour period of fermentation. Fermentation was carried out according to the conventional procedure. Then, about 600 grams of the beans, washed in water and cleaned of pulp, were placed in an enamel pot containing about 4 liters of boiling water having a 5% propylene glycol content and a 1 wt % citric acid content, in which they were boiled for 5 minutes under continued heating. After boiling, the beans were removed from the pot, being allowed to cool down. Then, the beans were dried in the sun for 6 days so that their water content was reduced to not more than 7%. Nibs of the beans were of white color in both their interior and their outer appearance and had good flavor.

EXAMPLE 11

Six hundred grams of beans, removed from pods in same way as in Example 1, were put in a pressure cooker in which was contained a 10% solution of propanol. Heating was carried out for 10 minutes in such a manner that the inner pressure of the cooker was kept at 1.5 atmospheres. After heating, the beans were removed from the cooker and were allowed to cool down. Then, the beans were dried in the sun for 6 days so that their water content was reduced to not more than 7%. Nibs of the beans were of white color in both their interior and their outer appearance and had good flavor.

What is claimed is:

1. A method of producing white cacao nibs characterized in that cacao beans of the colorless type, after harvest thereof, are preheated in an alcoholic environment at a temperature of 60° to 120° C. and for a period of time of 30 seconds to one hour without being subjected to fermentation or after being slighted fermented for a period of less than two days and are then dried, whereby cacao nibs of substantially white color are produced.

2. The method of claim 1, wherein said alcoholic environment comprises alcohol and hot water, water vapor or water vapor under pressure.

3. A method of producing white cacao nibs characterized in that cacao beans of the colorless type, after harvest thereof, are preheated in acidic solution at a temperature of 60° to 120° C. and for a period of time of 30 seconds to one hour without being subjected to fermentation or after being slightly fermented for a period of less than two days and are then dried, whereby cacao nibs of substantially white color are produced; wherein said acidic solution is selected from the group consisting of citric acid, acetic acid, tartaric acid, ascorbic acid, succinic acid, malic acid, lactic acid, and fumaric acid.

4. The method of claim 3, wherein said acidic solution comprises water vapor or water vapor under pressure.

5. A method of producing white cacao nibs characterized in that cacao beans of the colorless type, after harvest thereof, are preheated in acidic or alkaline hot water containing alcohol at a temperature of 60° to 120° for a period of time of 30 seconds to one hour without being subjected to fermentation or after being slightly fermented for a period of less than two days and are then dried, whereby cacao nibs of substantially white color are produced.

6. The method of claim 5 wherein said acidic solution is selected from the group consisting of citric acid, acetic acid, tartaric acid, ascorbic acid, succinic acid, malic acid, lactic acid and fumaric acid.

7. The method of claim 5, wherein said alkaline substance is selected from the group consisting of potassium carbonate, sodium carbonate, ammonium carbonate, ammonium bicarbonate, sodium bicarbonate, magnesium oxide, and sodium hydroxide.

8. The method of claim 1 or 5, wherein said alcohol used in the preheating step is selected from the group consisting of ethanol, propylene glycol and propanol.

9. The method of claim 5, wherein said-acidic or alkaline hot water comprises water vapor or water vapor under pressure.

10. The method of claim 1, 3 or 5, wherein further comprising the step of further drying or roasting the produced cacao nibs at a low temperature.

11. The method of claim 1, 3, or 5, wherein further comprising the step of roasting the produced cacao nibs using a conventional procedure.

* * * * *